UNITED STATES PATENT OFFICE.

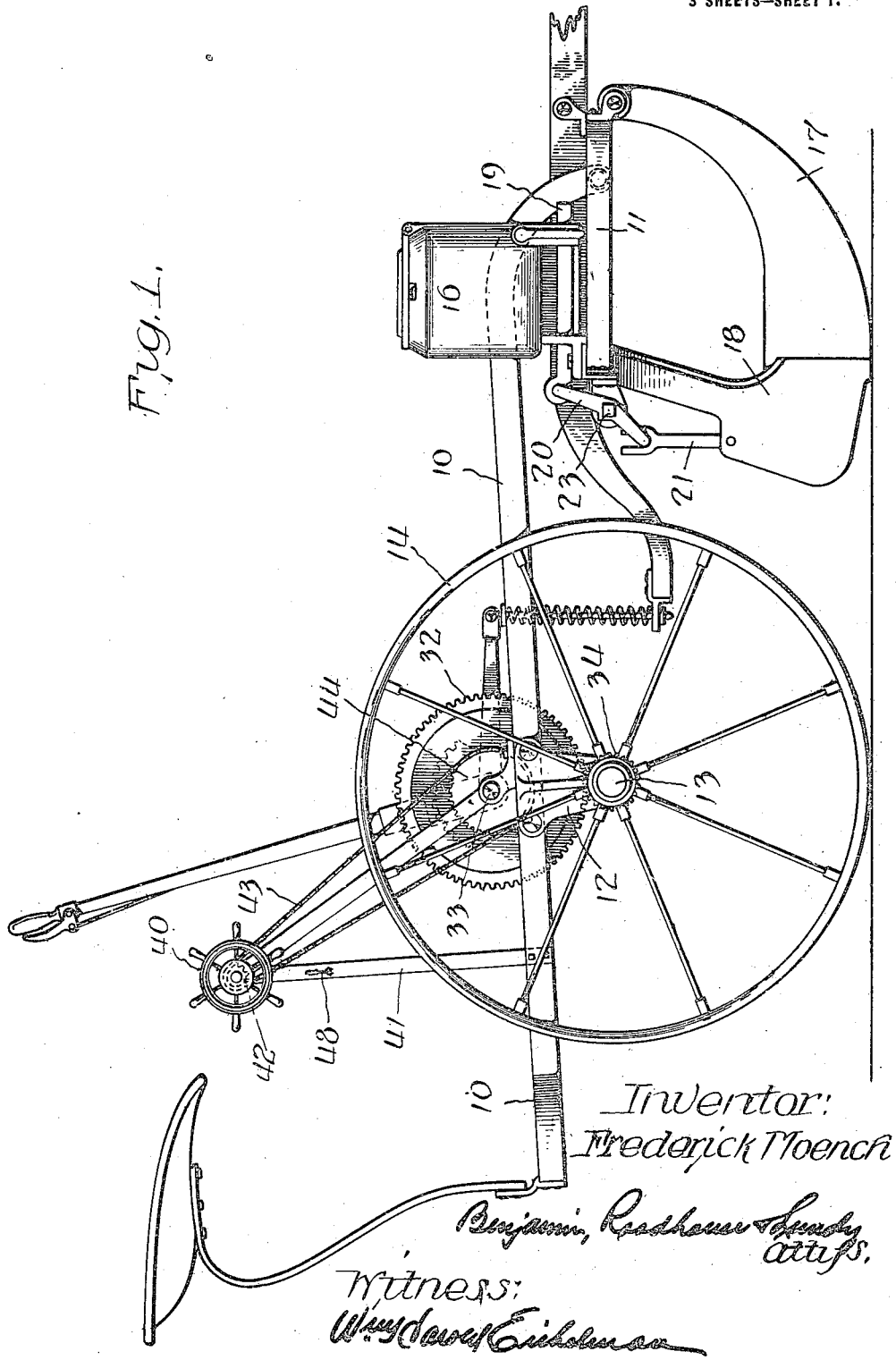

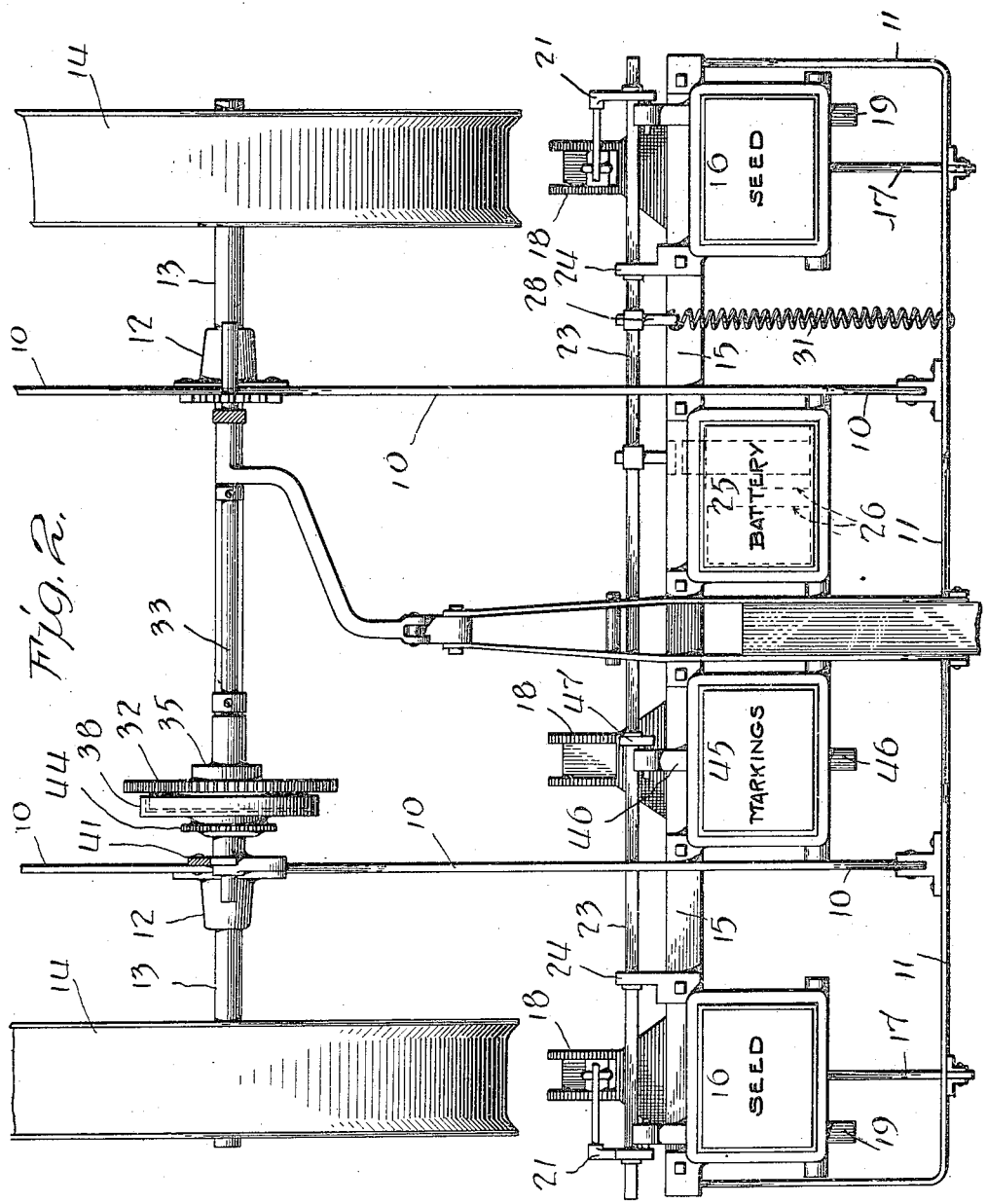

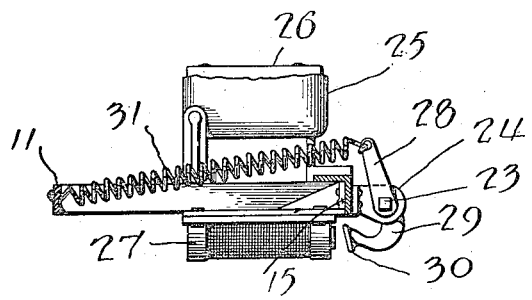
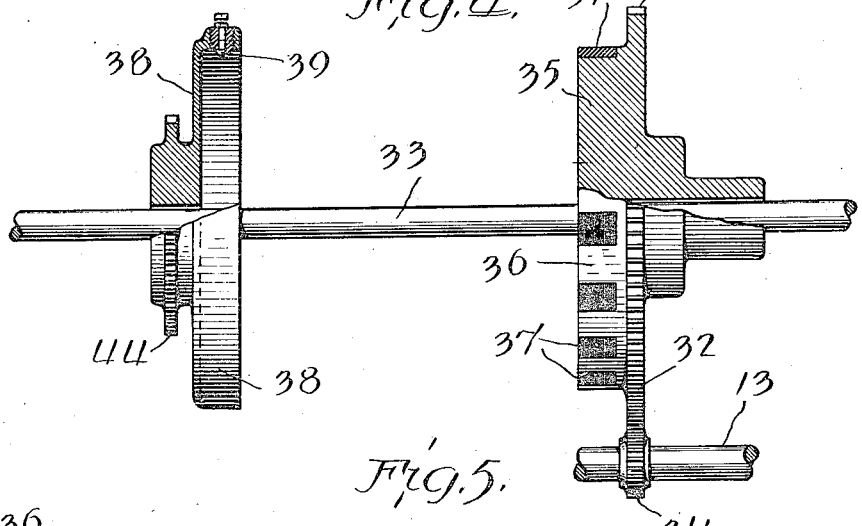
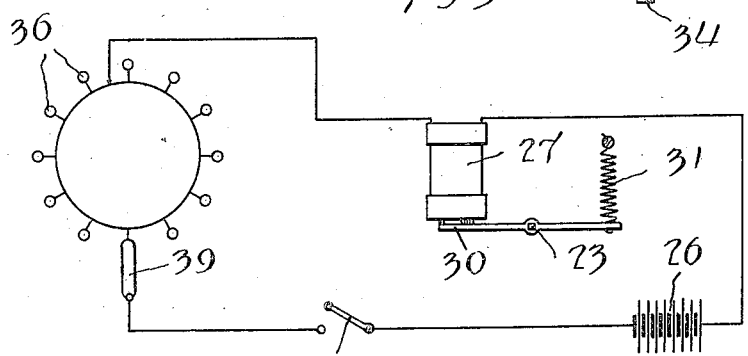

FREDERICK MOENCH, OF RUSHVILLE, ILLINOIS.

CHECK-ROW PLANTER.

1,252,923.   Specification of Letters Patent.   Patented Jan. 8, 1918.

Application filed April 7, 1916. Serial No. 89,514.

*To all whom it may concern:*

Be it known that I, FREDERICK MOENCH, a citizen of the United States, and a resident of Rushville, county of Schuyler, and State of Illinois, have invented certain new and useful Improvements in Check-Row Planters, of which the following is a specification.

My invention relates to automatic seed planters and more particularly to the means for adjusting and operating the checkers of automatic corn planters, although the principle of my invention is capable of adaptation to mechanism for planting divers grains and vegetables.

One of the objects of my invention is the provision in a planter whereby the checkers or feed valves may be actuated automatically by electrical energy and which is capable of adjustment so that the hills may be planted in symmetrically alining rows, or staggered rows, as desired.

Another object of my invention is the provision, in a planter, of suitable indicating devices that are adapted to mark the ground or soil adjacent each planting, so that proper adjustment may be made to dispose the rows in alinement with each other and to start the plantings with relation to each other in the respective rows.

Further objects of my invention are the provision of a planter of this character that is easy to manipulate and is comparatively simple in construction, so that it may be operated by unskilled labor.

I prefer to accomplish the divers objects of my invention by the means and in the manner hereinafter fully described and as more particularly pointed out in the claims, reference being had to the accompanying drawings forming a part of this specification, wherein,—

Figure 1 is a vertical side elevation of a seed planter constructed in accordance with my invention.

Fig. 2 is a top or plan view thereof, showing the relative disposition of the parts.

Fig. 3 is a fragmentary detail of the electrically operated portion of the mechanism.

Fig. 4 is a fragmentary detail, in elevation, and having the parts separated for clearness, showing the relative arrangement of the contact members for energizing the electrical actuating means for the seed hoppers.

Fig. 5 is a diagrammatical lay-out of the electrical circuit.

Referring more particularly to Figs. 1 and 2 of the drawings, it will be observed the planter preferably comprises the usual carriage consisting of the longitudinal frame members, 10, 10, connected at their forward ends by a substantially U-shaped cross-member, 11, and intermediate their ends provided with journal-bearing brackets, 12, 12, that afford bearings for the axle, 13, of the carriage.

Suitable wheels, 14, 14, with concave tires of the usual type, are mounted upon the outer extended ends of the axle or shaft, 13, so that the latter is adapted to rotate therewith and drive the mechanism to be hereinafter fully described.

Mounted upon the longitudinal frame members, 10, 10, between the U-shaped frame, 11, and the axle bearings, 12, is a cross-beam, 15, that is secured at its ends to the lateral or parallel members of the U-shaped frame, 11, and carries in longitudinal alinement with and in front of the wheels, 14, the usual seed hoppers, 16, 16.

Below these seed hoppers, 16, are segmental-shaped plows, 17, the forward upper ends whereof are pendantly secured to the U-shaped frame member, 11, and the rear portions whereof are secured to a substantialy vertically disposed chute or discharge trough, 18, through which the seed is discharged from the hoppers, 16, into the furrow made by the plows, 17.

A suitable mechanism is provided within the bottom of the seed hoppers for feeding a predetermined quantity of seed to the plow, and the same is released to the plow by means of a suitable slide valve, 19, the rear end portion whereof extends beyond the vertical plane of the rear of the hopper, 16, and has the upper end of a crank arm, 20, operatively connected thereto.

The opposite end of said crank arm, 20, engage the bifurcated upper end of a pivoted arm, 21, that has its lower end extended into the chute, 18, and is adapted to release the seed from the lower end of the chute into the furrow.

Intermediate its ends, the crank arm, 20, is rigidly mounted upon a square shaft, 23, that extends transversely and horizontally across the carriage, at the rear of the cross-piece, 15, and is mounted in suitable bearings, 24, projecting rearwardly from said cross-piece.

The mechanism so far described is substantially similar to an ordinary corn or seed planter, and is usually operated by mechanism connected with the axle of the carriage or by means of a suitable checker tape or wire fed through the machine as it traverses the soil.

In the carrying out of my invention I prefer to do away with this mechanical expedient, for actuating the valves and instead thereof, I have provided, between the longitudinal side members, 10, of the frame, a suitable box, 25, that carries storage batteries, 26, and below the frame and insulated therefrom are one or more magnets, 27, in circuit with the batteries. The square shaft, 23, is provided adjacent these magnets, 27, with a suitable crank arm, 28, the lower sickle-shaped end, 29, whereof is provided with an armature member, 30, adapted to be attracted by the cores of the magnets, 27, each time the magnets are energized, so as to rock the shaft, 23, and transmit a corresponding movement to the crank arm, 20, hereinbefore described in connection with the seed discharge and feeding valves. A spring, 31, secured to a crank arm, 28, mounted on the square shaft, 23, is provided to return the square shaft, 23, to its normal position, thereby closing the valves, when the circuit is broken, and the magnet loses its attracting power.

In order that the magnets may be energized so as to secure the desired deposition of the seed, I have provided a suitable gear, 32, rotatably mounted upon a shaft, 33, which gear is adapted to be actuated by means of a pinion, 34, rigidly mounted upon the axle, 13, of the planter. One face of the gear, 32, is provided with an embossment, 35, the periphery of which is interrupted with suitable insulating plates, 37, so as to leave between the insulating plates, contact areas, 36. This embossment, 35, is adapted to be inclosed within a shell, 38, that surrounds the same and is provided with an insulated contact point, 39, which is adapted to contact the periphery of the embossment in the path of the insulating plates, 37.

This shell is journaled upon the shaft, 33, and is adapted to be rotated thereon for the purpose of adjustment by means of a control-wheel, 40, journaled upon the upper end of a standard, 41, and connected by means of a sprocket, 42, and chain, 43, with a large sprocket, 44, upon the outer face of the shell, 38.

The rotation of the axle, 13, will revolve the gear, 32, and cause the contacts, 36, to come into successive engagement with the terminal, 39, and thus successively energize the magnet, 27, causing the attraction of the armature, 30, and the consequent rotary reciprocable motion of the rock-shaft, 23, to operate the valves.

When each row is started, the operator adjusts the control-wheel, 40, until the contact point or terminal, 39, engages its respective contact, 36, to release the valve in such order that the planting will be in proper relation to the preceding rows.

In order to identify the point of planting, I have provided a suitable box, 45, that contains a quantity of suitable marking material, such as chalk or lime, in powdered form, and which is adapted to be released by a slide valve, 46, that is actuated by a crank arm, 47, carried by the square rock-shaft, 23, hereinbefore mentioned, so that each time the seed valves are operated, the marking valve will simultaneously operate and deposit a small quantity of marking material upon the soil.

From the above it will be obvious that the planting or checking operations are accomplished in a successful manner and the rows may be planted in alinement with each other, and little or no trouble will be had in ascertaining the location of each planting when the successive row is being traversed by the apparatus.

In order that the mechanism may be thrown out of operation, I provide a suitable knife switch, 48, upon the standard, 41, and interposed in the circuit leading from the batteries to the contact members.

While I have illustrated and described certain specific means for carrying out my invention, it, of course, will be obvious to others skilled in the art to which the same pertains, that various modifications or refinements thereof are possible without materially departing from the spirit of my invention. For example, the contact point or terminal, 39, may be disposed upon the embossment, 35, or the rock-shaft, 23, may be actuated by means of a solenoid mechanism. I therefore desire it to be understood that all such obvious changes are contemplated as included within the scope of my invention as expressed in the appended claims.

What I claim is:—

1. In a seed planter having seed hoppers and means for discharging seed therefrom, means for controlling the deposit of the discharged seed including an armature, and an electro-magnet, a commutator and a contact brush in circuit, said commutator being in mechanical train with the wheels of said planter, and said contact brush adapted to rotate concentrically with said commutator to co-act therewith and close said circuit.

2. In a seed planter having seed hoppers and means for discharging seed therefrom, devices for indicating the disposition of each planting, and common means for controlling the deposit of discharged seed and said indicating devices including an armature, and an electro-magnet, a commutator and a contact brush in circuit, said commutator being in mechanical train with the wheels of said planter, said contact brush adapted to rotate concentrically with said commutator to co-act therewith and close said circuit.

3. In a seed planter having seed hoppers and means for discharging seed therefrom, means for controlling the deposit of the discharged seed including an armature, and an electro-magnet, a commutator and a contact brush in circuit, said commutator being in mechanical train with the wheels of said planter, said contact brush adapted to rotate concentrically and independently of said commutator to co-act therewith and close said circuit, and means for indicating the deposition of each planting, said last-mentioned means comprising a hopper containing a finely divided marking medium, a valve controlling the discharge of said marking medium, and means for operating said valve in timed relation with said seed delivery and actuated by said electrical elements.

4. In a seed planter having seed hoppers and means for discharging seed therefrom, electro-magnetic means for controlling deposit of the discharged seed including electro-responsive reciprocal means, a rotatable commutator for controlling same, and an adjustable contact for said commutator disposed to be moved concentrically therewith and independently thereof.

5. In combination with a seed planter provided with supporting wheels, a seed receptacle, and means for discharging seed therefrom, of means for controlling the deposit of the discharged seed including an electro-responsive device adapted to actuate said discharging means, a circuit in which said device is interposed, and devices for intermittently closing said circuit, said devices including a rotatable commutator actuated by the rotation of said supporting wheels, and a contact brush movable concentrically thereto and adjustable independently thereof.

6. In combination with a seed planter provided with supporting wheels, a seed receptacle, and means for discharging seed therefrom, means for controlling the deposit of the discharged seed including an electro-magnet adapted to actuate said discharging means, a circuit in which said magnet is interposed, and a disk provided with a plurality of contacts actuated by the rotation of the supporting wheels, and a brush engaging said contacts adapted to intermittently close said circuit, said brush capable of adjustment independently of said disk whereby the operation of the seed discharging means is regulated.

Signed at Chicago, county of Cook and State of Illinois, this 5th day of April, 1916.

FREDERICK MOENCH.

Witnesses:
GARCIA STREITBERGER,
BENJ. T. ROODHAUSE.

Copies of this patent may be obtained for five cents each, by addressing the "Commissioner of Patents. Washington, D. C."